(12) United States Patent
Wu

(10) Patent No.: US 6,481,518 B1
(45) Date of Patent: Nov. 19, 2002

(54) MOTOR DRIVE MOUNTING ARRANGEMENT FOR GOLF CART

(76) Inventor: David Wu, No. 35-1, Jih Hsin Street, Tu Cheng City, Taipei (TW)

(*) Notice: Subject to any disclaimer, the term of this patent is extended or adjusted under 35 U.S.C. 154(b) by 0 days.

(21) Appl. No.: 09/922,799

(22) Filed: Aug. 7, 2001

(51) Int. Cl.⁷ .................................................. B60K 1/00
(52) U.S. Cl. .................... 180/65.6; 180/65.5; 180/19.1; 280/47.27; 280/DIG. 6
(58) Field of Search ...................... 280/DIG. 6, DIG. 5, 280/47.27; 180/19.1, 19.3, 908, 65.1, 65.5, 65.6, 343, 21; 74/640, 431; 475/5, 10, 168, 219

(56) References Cited

U.S. PATENT DOCUMENTS

| | | | | |
|---|---|---|---|---|
| 3,094,185 A | * | 6/1963 | Racoosin ...................... | 180/11 |
| 3,096,992 A | * | 7/1963 | Fritsch ......................... | 248/96 |
| 3,686,978 A | * | 8/1972 | Knoblach et al. ........... | 475/296 |
| 3,820,617 A | * | 6/1974 | Groff ........................... | 180/10 |
| 3,948,332 A | * | 4/1976 | Tyner .......................... | 180/19.1 |
| 4,133,344 A | * | 1/1979 | Hunter et al. ............... | 239/728 |
| 4,356,875 A | * | 11/1982 | Clune .......................... | 180/13 |
| 4,618,102 A | * | 10/1986 | Meis et al. .................. | 180/65.6 |
| 4,799,564 A | * | 1/1989 | Iijima et al. ................ | 180/65.5 |
| 5,137,103 A | * | 8/1992 | Cartmell ...................... | 180/13 |
| 5,526,894 A | * | 6/1996 | Wang .......................... | 180/65.1 |
| 5,582,419 A | * | 12/1996 | Lucia et al. .................. | 280/42 |
| 5,839,528 A | * | 11/1998 | Lee .............................. | 180/11 |
| 6,199,652 B1 | * | 3/2001 | Mastroianni et al. ....... | 180/229 |
| 6,296,260 B1 | * | 10/2001 | Schiavone .................... | 188/19 |

FOREIGN PATENT DOCUMENTS

SE WO 90/12624 * 11/1990 ........... A63B/55/08

* cited by examiner

Primary Examiner—Anne Marie Boehler
Assistant Examiner—Daniel Yeagley
(74) Attorney, Agent, or Firm—Varndell & Varndell, PLLC

(57) ABSTRACT

A motor drive mounting arrangement includes a wheel holder fixedly fastened to the front end of the main shaft member of a golf cart to hold a motor holder and a transmission gearbox, a driving wheel supported on the transmission gearbox for synchronous rotation to move the golf cart upon operation of the motor in the motor holder, a battery holder mounted on the main shaft member of the golf cart to support the golf bag being carried on the golf cart and controlled by a circuit control box at the wheel holder to provide battery power supply to the motor in the motor holder.

1 Claim, 9 Drawing Sheets

MOTOR DRIVE MOUNTING ARRANGEMENT FOR GOLF CART

The present invention relates to golf carts and, more particularly, to a motor drive mounting arrangement for golf cart.

Various motorized golf carts are known. FIG. 1 shows a motorized golf cart according to the prior art. This structure of motorized golf cart 80 comprises a main shaft member 81, a front wheel 82 coupled to the bottom side of the front end of the main shaft member 81, a bottom bracket 83 coupled to the main shaft member 81, two rear wheels 86 coupled to the bottom bracket 83 at two opposite lateral sides, and a motor drive unit 84 and a storage battery 85 installed in the bottom bracket 83. The motor drive unit 84 comprises a motor 851, and a transmission gearbox 852 driven by the motor 851 to rotate the rear wheels 86. This structure of motorized golf cart 80 occupies much storage space when not in use. FIG. 2 shows a folding collapsible type motorized golf cart 90 according to the prior art. According to this structure of folding collapsible type motorized golf cart 90, an additional front wheel 93 is provided at the bottom side of the front end of the main shaft member 94, and the motor drive unit 91 and the storage battery 95 are disposed behind the rear wheels 92. Because the motor drive unit 91 and the storage battery 95 are positioned behind the rear wheels 92, it is inconvenient to fold up the motorized gold cart 90.

The present invention has been accomplished under the circumstances in view. It is the main object of the present invention to provide a motor drive mounting arrangement for golf cart, which requires less installation space, enabling the golf cart to be conveniently folded up. It is another object of the present invention to provide a motor drive mounting arrangement for golf cart, which serves as a lower bag cradle to support the bottom cuff of the golf bag being carried on the golf cart. According to one aspect of the present invention, the motor drive mounting arrangement comprises a wheel holder fixedly fastened to the front end of the main shaft member of a golf cart to hold a motor holder and a transmission gearbox, a driving wheel supported on the transmission gearbox for synchronous rotation with the transmission gearbox to move the golf cart upon operation of the motor in the motor holder, a battery holder mounted on the main shaft member of the golf cart and controlled by a circuit control box at the wheel holder to provide battery power supply to the motor in the motor holder. According to another aspect of the present invention, the driving wheel has an insertion hole, which receives the transmission gearbox for enabling the driving wheel to be rotated with the transmission gearbox, and a receiving chamber, which receives the motor holder to minimize space occupation. According to still another aspect of the present invention, the wheel holder has a rear sidewall matching a top sidewall of the battery holder to serve as a lower bag cradle for supporting a golf bag on the main shaft member of the golf cart. According to still another aspect of the present invention, the wheel holder has a smoothly arched top sidewall suspending over the driving wheel to function as a front mudguard.

DETAILED DESCRIPTION OF THE PREFERRED EMBODIMENT

Figure 6:
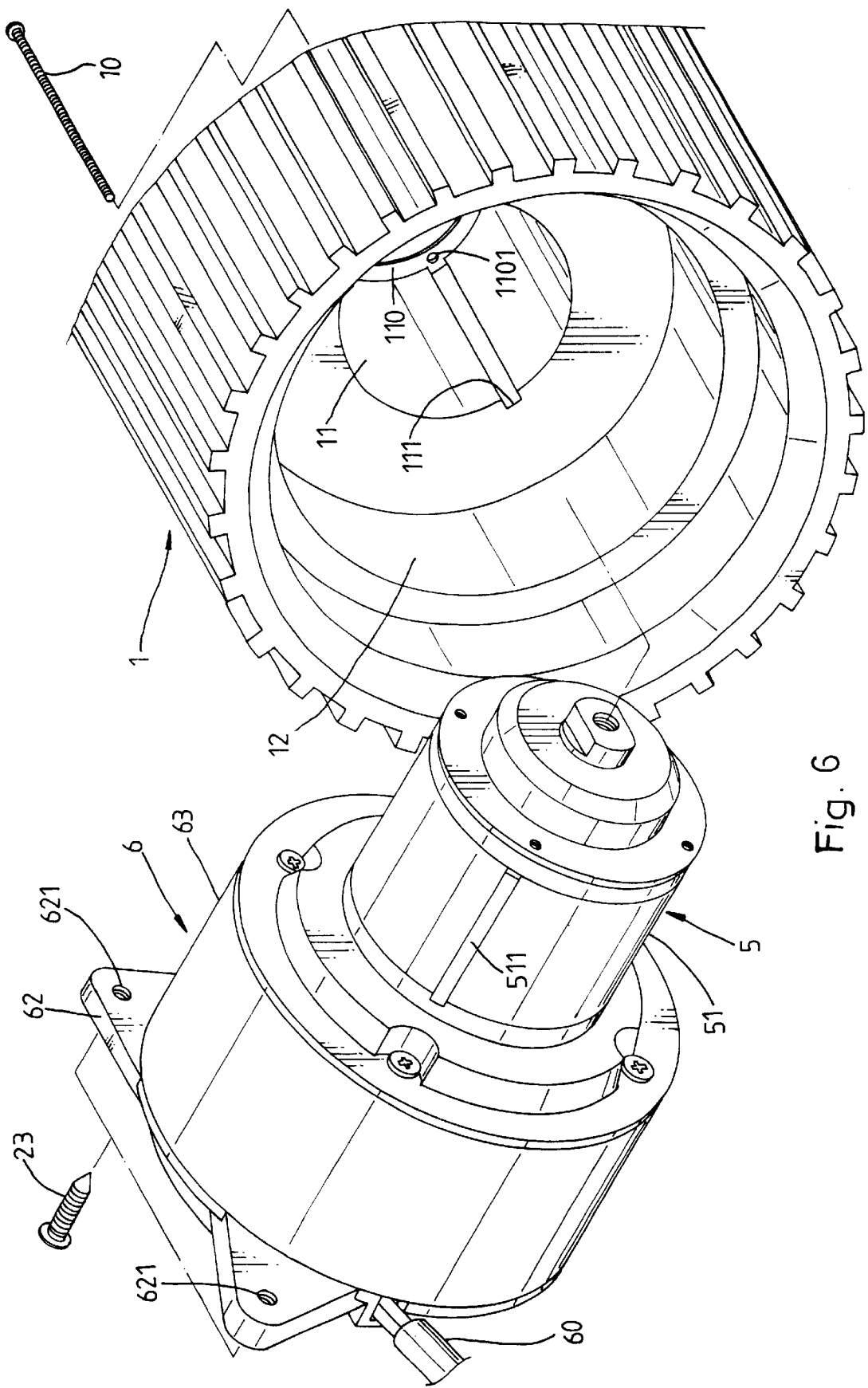
FIG. 6 is an exploded view of a part of the present invention, showing the arrangement of the motor holder, the transmission gearbox, and the driving wheel.
Figure 7:
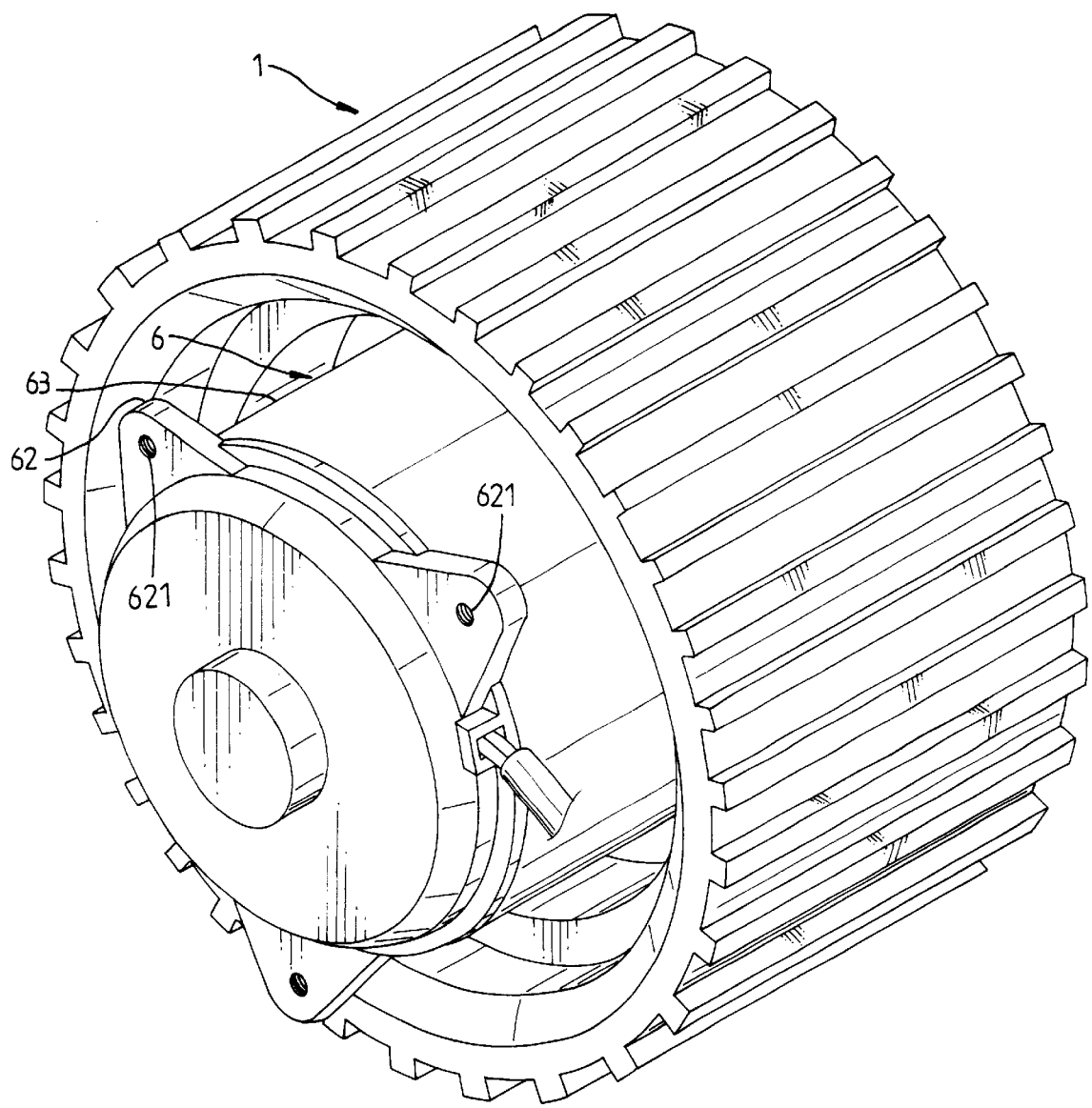
FIG. 7 is an assembly view of the parts shown in FIG. 6.

Referring to Figures From 3 through 9, a motorized golf cart 7 is shown comprising a motor drive system controlled to move the motorized golf cart. The motor drive system is comprised of a driving wheel 1, a wheel holder 2, a circuit control box 31, a storage battery 41, a battery holder 42, a transmission gearbox 5 (see FIG. 6), and a motor holder 6. The motor holder 6 holds a motor (not shown) on the insides. The motor in the motor holder 6 is electrically connected to the circuit control box 31 by electric wires 60, having an output shaft 61 coupled to the driving wheel 1 through the transmission gearbox 5. The battery holder 42 is electrically connected to the circuit control box 31, and adapted to provide the necessary working voltage to the motor inside the motor holder 6. The handle 71 of the golf cart 7 comprises an On/Off switch 711. When switching on the On/Off switch 711, the circuit control box 31 drives the motor in the motor holder 6 to rotate its output shaft 61, thereby causing the transmission gearbox 5 to rotate the driving wheel 1.

Figure 1:
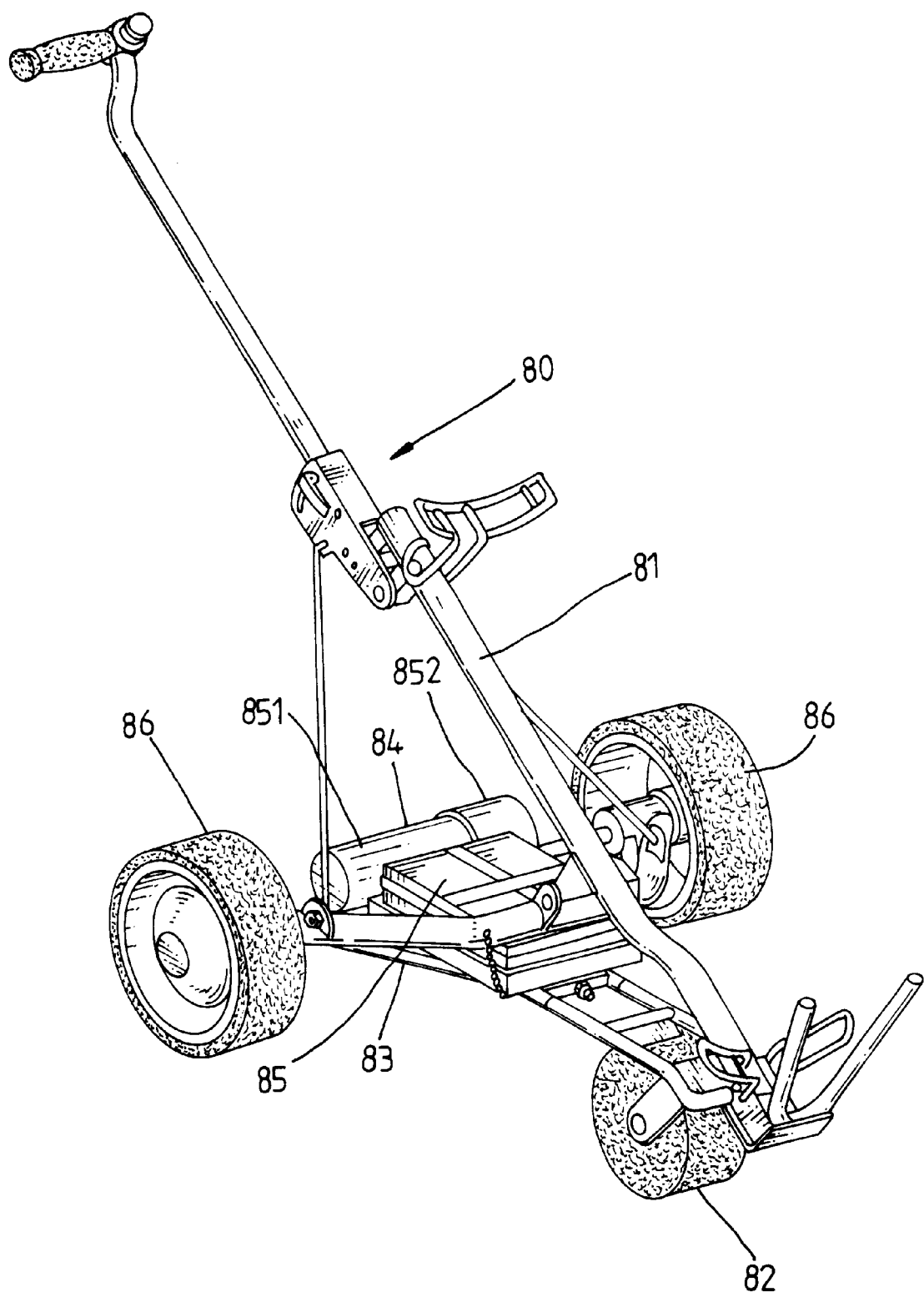
FIG. 1 is an elevational view of a motorized golf cart according to the prior art.
Figure 2:
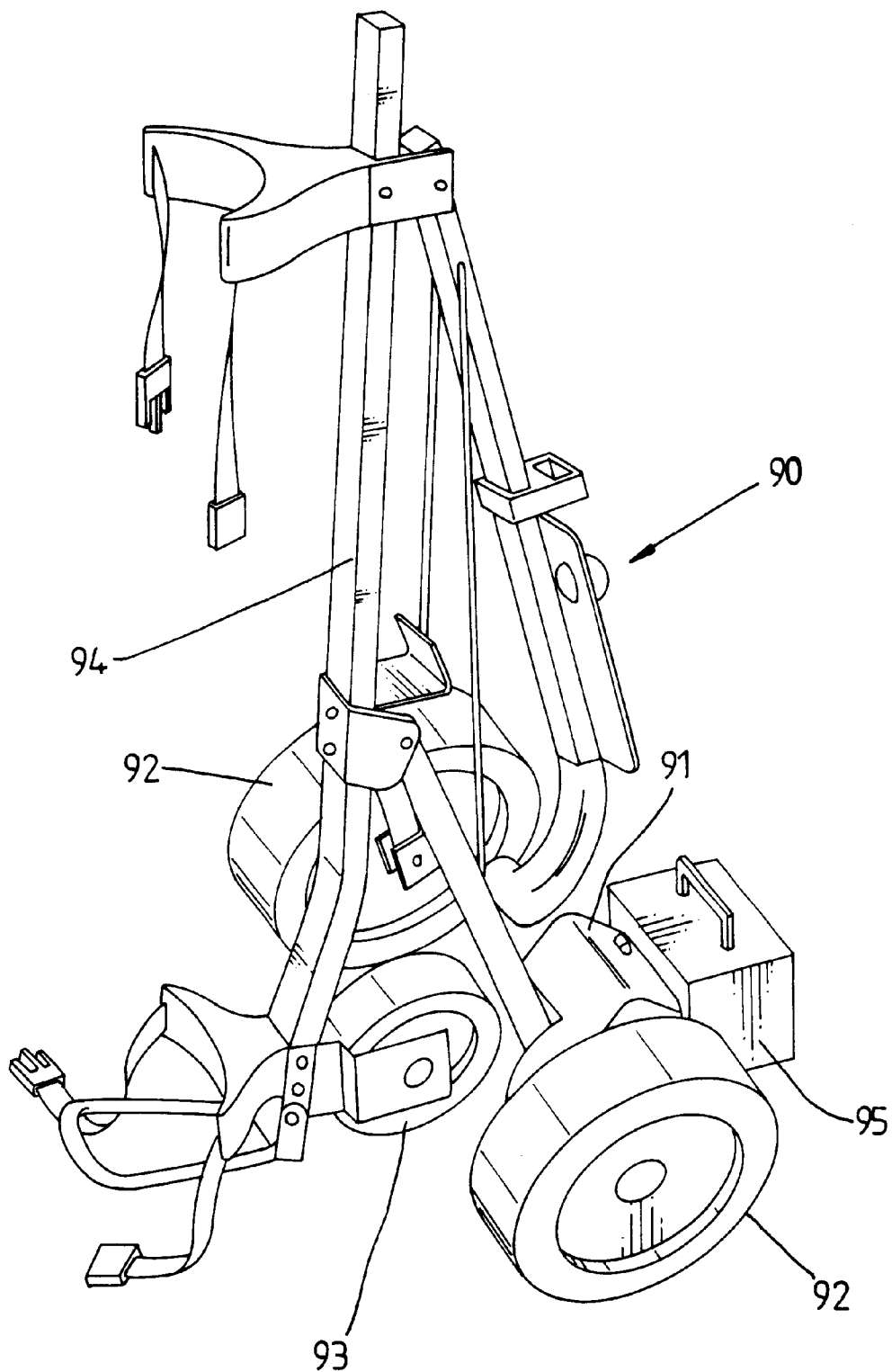
FIG. 2 illustrates the collapsed condition of a folding collapsible type motorized golf cart according to the prior art.
Figure 3:
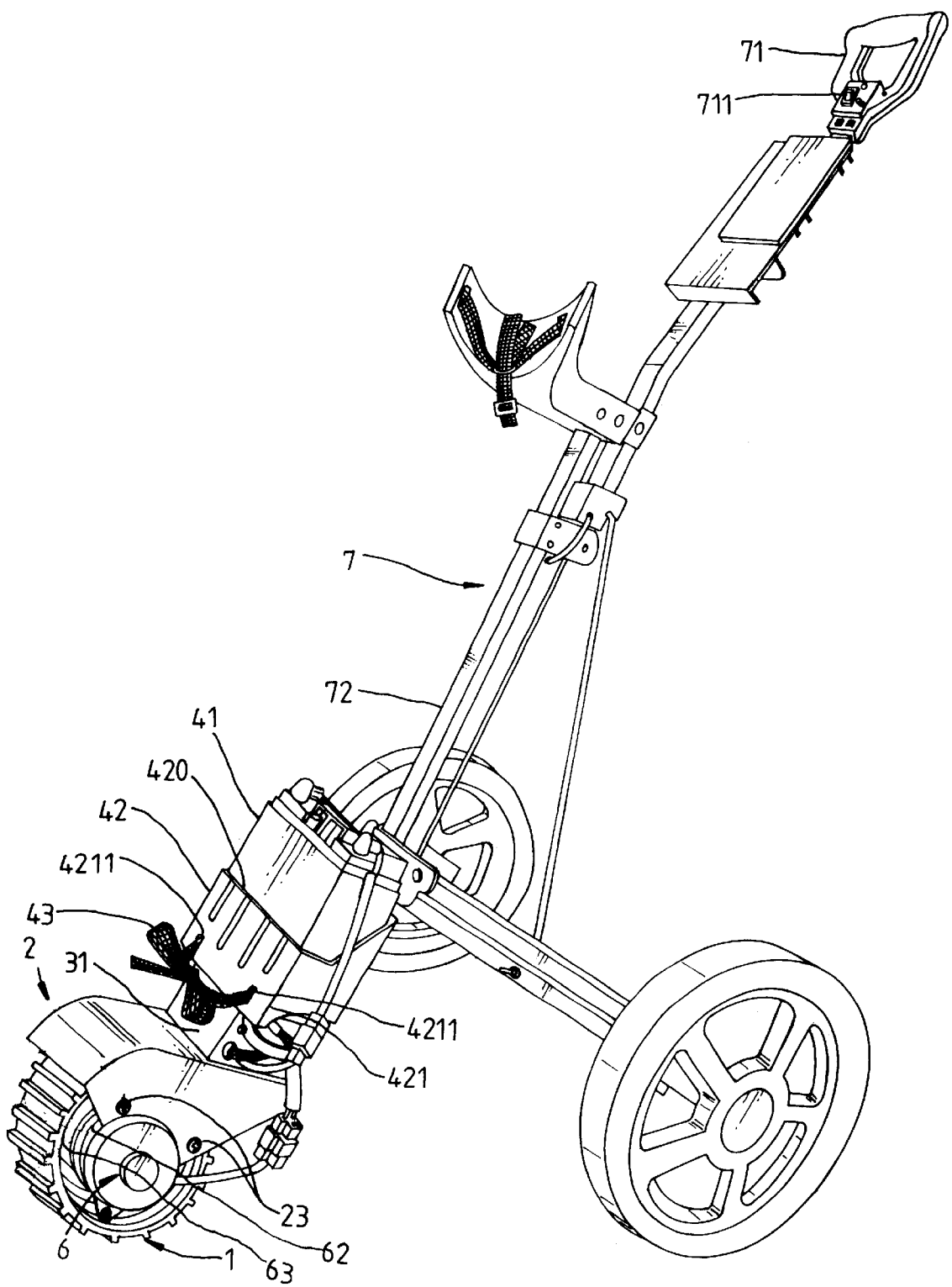
FIG. 3 is an elevational view of a folding collapsible type motorized golf cart constructed according to the present invention.
Figure 4:
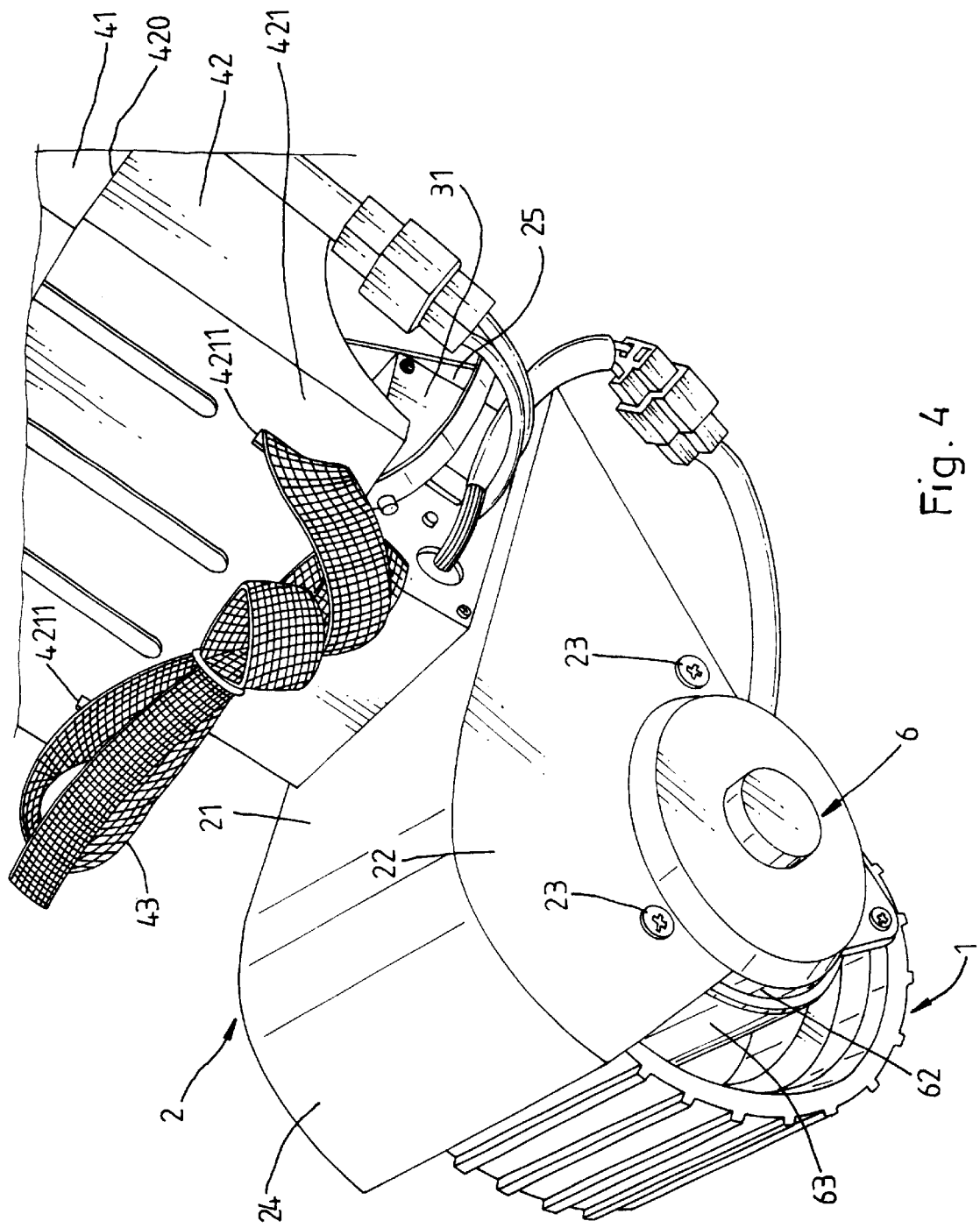
FIG. 4 is an enlarged view of the front part of the folding collapsible type motorized golf cart shown in FIG. 3.
Figure 5:
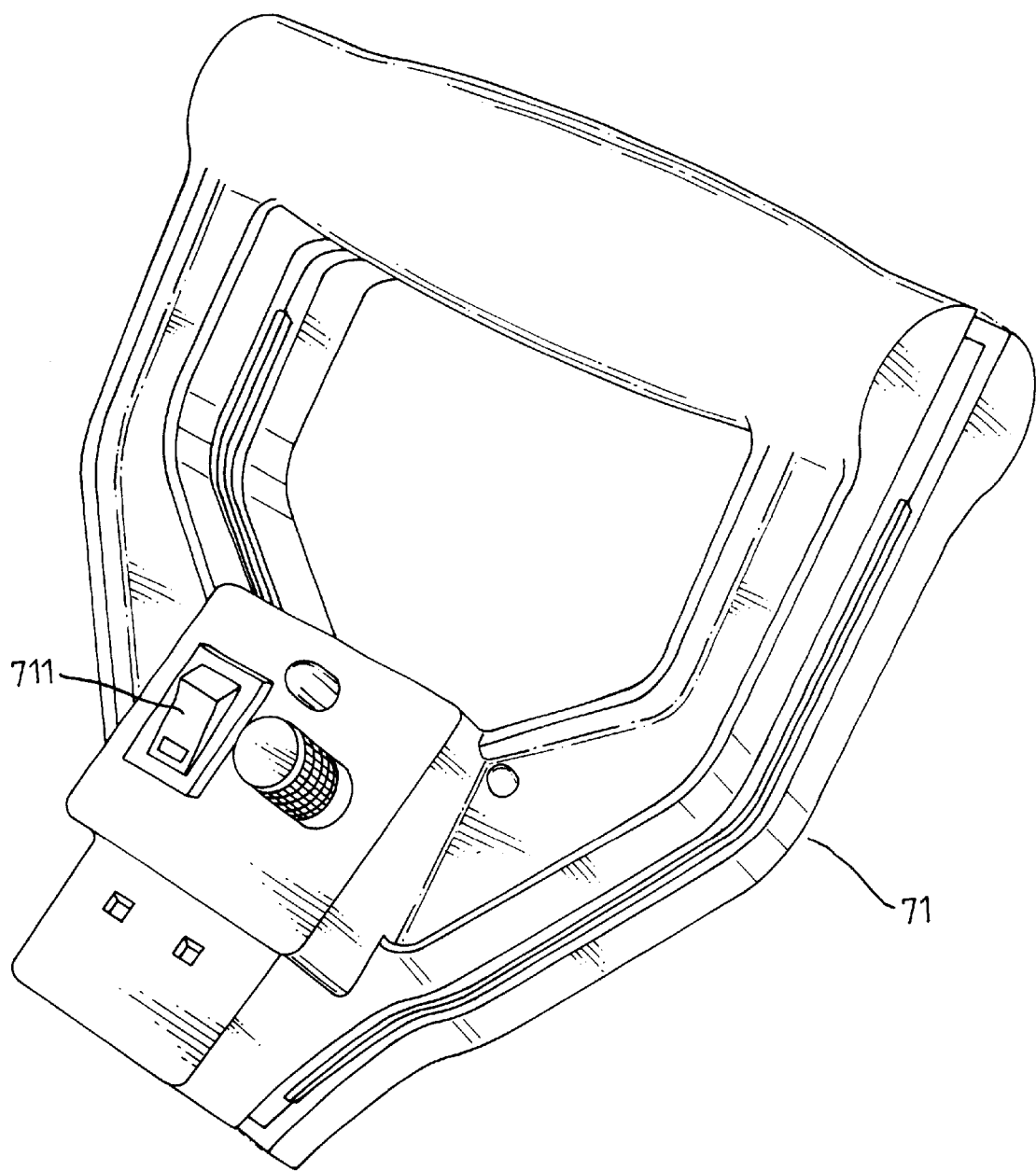
FIG. 5 is an enlarged view of a part of FIG. 3 showing the structure of the handle of the golf cart.
Figure 9:
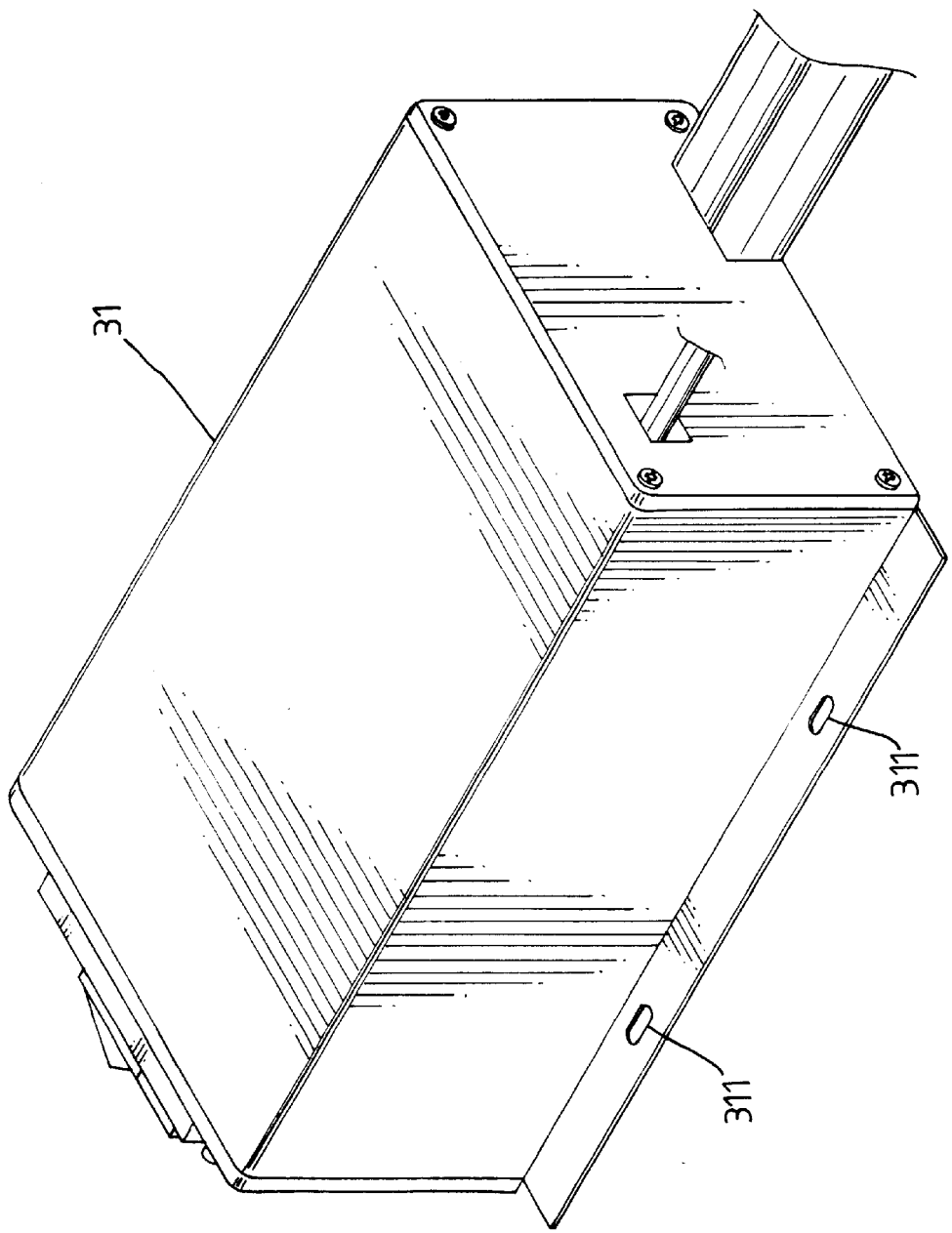
FIG. 9 is an elevational view of the circuit control box according to the present invention.

The features of the present invention are outlined hereinafter with reference to Figures from 3 through 9 again. The wheel holder 2 comprises a backwardly extended mounting flange 25 (see FIG. 4) fastened to the front end of the main shaft member 72 of the golf cart 7, a rear sidewall 21 adapted to support the bottom cuff of the golf bag (not- shown) being carried on the golf cart 7, two lateral sidewalls 22, and a smoothly arched top sidewall 24 forwardly extended from the rear sidewall 21 between the lateral sidewalls 22. One lateral sidewall 22 of the wheel holder 2 is fixedly fastened to the motor holder 6. The lateral sidewalls 22 and the smoothly arched top sidewall 24 serve as a front mudguard around the driving wheel 1 to protect against splashing mud. The motor holder 6 comprises a cylindrical holder body 63 inserted into the driving wheel 1, and a mounting flange 62 at one side of the cylindrical holder body 63. The mounting flange 62 has a plurality of mounting holes 621 respectively fixedly fastened to one lateral sidewall 22 of the wheel holder 2 by fastening elements, for example, screws 23 (see FIG. 6). The transmission gearbox 5 comprises a cylindrical casing 51. The cylindrical casing 51 comprises a plurality of longitudinal coupling ribs 511 equiangularly spaced around the periphery for coupling to the driving wheel 1. The driving wheel 1 comprises an axially extended insertion hole 11 adapted to receive the cylindrical casing 51 of the transmission gearbox 5, a receiving chamber 12 concentrically disposed in communication with the insertion hole 11 at one side and adapted to receive the cylindrical holder body 63 of the motor holder 6, an annular flange 110 extended around the insertion hole 11 at one side opposite to the receiving chamber 12, a plurality of coupling grooves 111 equiangularly spaced around the insertion hole 11 and adapted to receive the coupling ribs 511 of the cylindrical casing 51 of the transmission gearbox 5. The annular flange 110 has a plurality of equiangularly spaced mounting holes 1101. After insertion of the cylindrical casing 51 of the transmission gearbox 5 into the insertion hole 11 of the driving wheel 1, fastening elements, for example, screws 10 are respectively mounted in the mounting holes 1101 to fixedly secure the driving wheel 1 to the transmission gearbox 5, for enabling the driving wheel 1 to be rotated with the transmission gearbox 5. The circuit control box 31 comprises a plurality of mounting holes 311 (see FIG. 9) respectively fastened to the mounting flange 25 of the wheel holder 2 by fastening elements. The battery holder 42 is fixedly fastened to the main shaft member 72 of the golf cart 7 behind the circuit control box 31, comprising a battery chamber 420, which receives the storage battery 41, belt holes 4211 in the top sidewall 421 thereof, and a harness 43 installed in the belt holes 421 and adapted to secure a golf bag on the top sidewall 421 of the battery holder 42.

Figure 8:
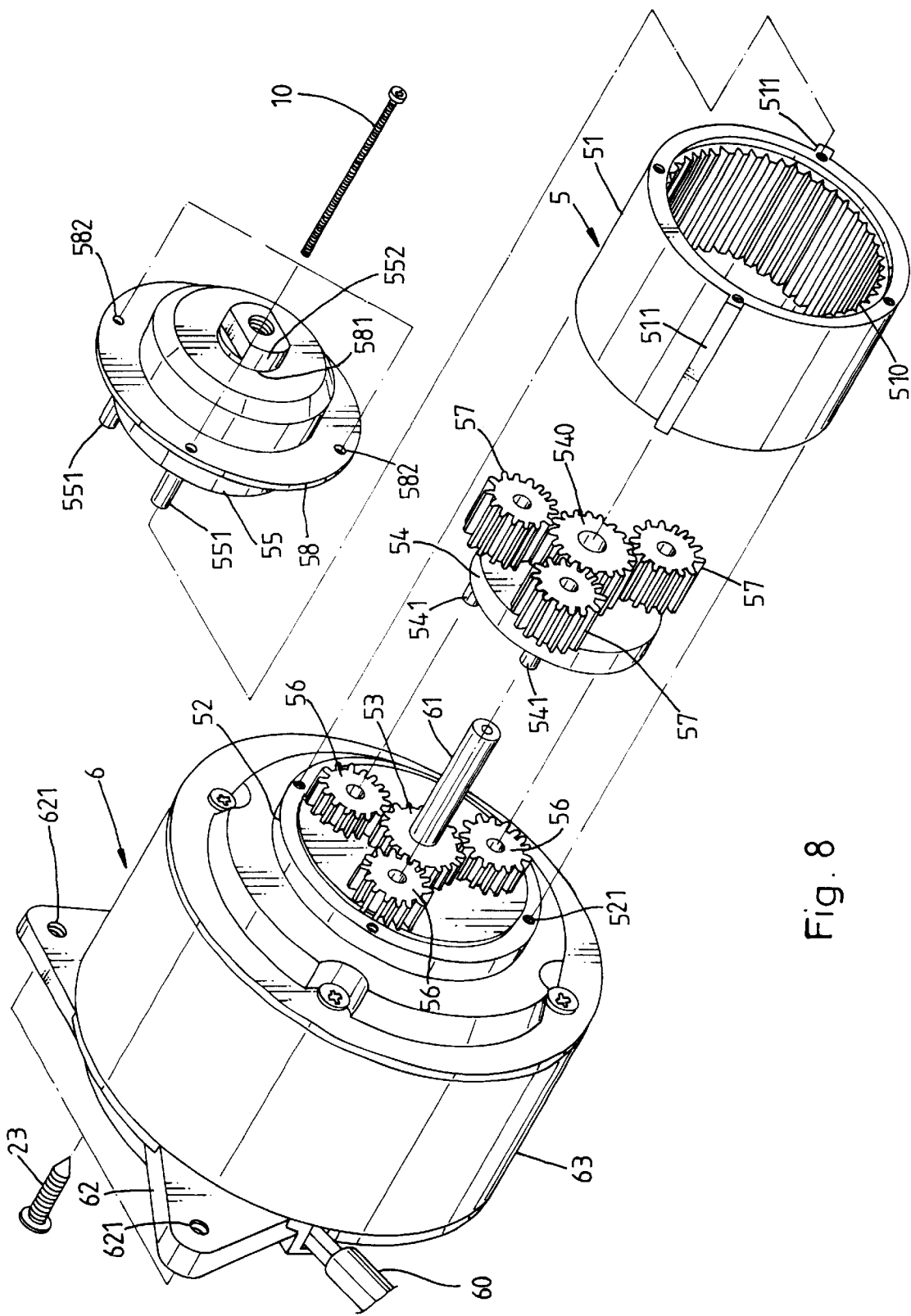
FIG. 8 is an exploded view of the transmission gearbox according to the present invention.

Referring to FIG. 8, the transmission gearbox 5 is comprised of the aforesaid cylindrical casing 51, a mounting disk 52, a drive gear 53, a first gear wheel mount 54, a second gear wheel mount 55, first transmission gears 56, second transmission gears 57, and a cover plate 58. The cylindrical casing 51 comprises an internal gear 510. The mounting disk 52 is pivoted to the output shaft 61 of the motor in the motor holder 6, comprising a plurality of screw holes 521 respectively fastened to the mounting holes 1101 of the driving wheel 1 to the transmission gearbox 5 by the aforesaid screws 10. The drive gear 53 is fixedly mounted on the output shaft 61 of the motor of the motor holder 6. The first gear wheel mount 54 comprises a plurality of gear shafts 541 axially disposed at one side, and a driven gear 540 disposed at the center of the other side. The first transmission gears 56 are respectively pivoted the gear shafts 541 of the first gear wheel mount 54 and meshed with the drive gear 53. The second gear wheel mount 55 comprises a plurality of gear shafts 551 axially disposed at one side, and a coupling shaft 552 disposed at the other side. The coupling shaft 552 has a non-circular cross section. The second transmission gears 57 are respectively pivoted to the gear shafts 551 of the second gear wheel mount 55 and meshed between the driven gear 540 and the internal gear 510 of the cylindrical casing 51. The cover plate 58 has a center coupling hole 581, which receives the coupling shaft 552 of the second gear wheel mount 55, and a plurality of mounting through holes 582 respectively connected between the screw holes 521 of the mounting disk 52 and the mounting holes 1101 of the driving wheel 1 by the aforesaid screws 10. When starting the motor in the motor holder 6 to rotate the output shaft 61, the drive gear 53 is rotated with the output shaft 61 to rotate the first transmission gears 56, thereby causing the driven gear 540 to rotate the cylindrical casing 51 and the driving wheel 1 through the second transmission gears 57 (because the coupling ribs 511 of the cylindrical casing 51 of the transmission gearbox 5 are respectively coupled to the coupling grooves 111 of the driving wheel 1, the driving wheel 1 is rotated with the cylindrical casing 51 during rotary motion of the cylindrical casing 51).

What is claimed is:

1. A motor drive mounting arrangement installed in the main shaft member of a golf cart and controlled by an On/Off switch on the golf cart to move the golf cart, the motor drive mounting arrangement comprising:

a wheel holder, said wheel holder comprising a backwardly extended mounting flange fixedly fastened to a front end of the main shaft member of the golf cart, a rear sidewall adapted to support the bottom cuff of a golf bag on the golf cart, two lateral sidewalls, and a smoothly arched top sidewall forwardly extended from said rear sidewall between said lateral sidewalls, the lateral sidewalls and smoothly arched top sidewall of said wheel holder forming a front mudguard;

a motor holder holding a motor having an output shaft, said motor holder comprising a cylindrical holder body, and a mounting flange disposed at one side of said cylindrical holder body, the mounting flange of said motor holder having a plurality of mounting holes respectively fixedly fastened to one lateral sidewall of said wheel holder by fastening elements;

a transmission gearbox coupled to the output shaft of the motor of said motor holder, said transmission gearbox comprising a cylindrical casing, said cylindrical casing comprising a plurality of longitudinal coupling ribs equiangularly spaced around the periphery thereof;

a driving wheel mounted on the cylindrical casing of said transmission gear box for synchronous rotation with the cylindrical casing of said transmission gear box upon rotary motion of the output shaft of said motor, said driving wheel comprising an axially extended insertion hole adapted to receive the cylindrical casing of said transmission gearbox, a receiving chamber concentrically disposed in communication with said insertion hole at one side and adapted to receive the cylindrical holder body of said motor holder, an annular flange extended around said insertion hole at one side opposite to said receiving chamber, and a plurality of coupling grooves equiangularly spaced around said insertion hole and adapted to receive the coupling ribs of said cylindrical casing of said transmission gearbox, said annular flange having a plurality of equiangularly spaced mounting holes respectively fastened to said transmission gearbox;

a circuit control box fixedly fastened to the mounting flange of said wheel holder at a top side;

a battery holder fixedly fastened to the main shaft member of the golf cart adjacent to said circuit control box, said battery holder comprising a battery chamber holding a storage battery, which is electrically connected to said motor through said circuit control box, belt holes in a top sidewall thereof, and a harness installed in said belt holes and adapted to secure a golf bag on the top sidewall of said battery holder.

* * * * *